United States Patent
Majumdar et al.

(10) Patent No.: US 10,268,195 B2
(45) Date of Patent: Apr. 23, 2019

(54) MANAGING VEHICLE DRIVING CONTROL ENTITY TRANSITIONS OF AN AUTONOMOUS VEHICLE BASED ON AN EVALUATION OF PERFORMANCE CRITERIA

(71) Applicant: QUALCOMM Incorporated, San Diego, CA (US)

(72) Inventors: Somdeb Majumdar, Mission Viejo, CA (US); Mainak Biswas, San Diego, CA (US); William Henry Von Novak, San Diego, CA (US); Muhammed Sezan, Los Gatos, CA (US)

(73) Assignee: QUALCOMM Incorporated, San Diego, CA (US)

( * ) Notice: Subject to any disclaimer, the term of this patent is extended or adjusted under 35 U.S.C. 154(b) by 87 days.

(21) Appl. No.: 15/399,980

(22) Filed: Jan. 6, 2017

(65) Prior Publication Data
US 2018/0196427 A1    Jul. 12, 2018

(51) Int. Cl.
| | | |
|---|---|---|
| *G05D 1/00* | (2006.01) | |
| *B60W 40/09* | (2012.01) | |
| *B60W 50/14* | (2012.01) | |
| *G05B 13/02* | (2006.01) | |
| *B60W 50/00* | (2006.01) | |

(52) U.S. Cl.
CPC ........... *G05D 1/0061* (2013.01); *B60W 40/09* (2013.01); *B60W 50/14* (2013.01); *G05B 13/021* (2013.01); *G05D 1/0088* (2013.01); *B60W 2050/0095* (2013.01); *G05D 2201/0213* (2013.01)

(58) Field of Classification Search
CPC .. G05D 1/0055; G05D 1/0061; G05D 1/0077; G05D 1/0081; G05D 1/0088; B60K 28/06; B60W 40/09; B60W 50/087; B60W 50/14; B60W 2050/0095; B60W 2540/22; B60W 2540/26; G07C 5/0808; G07C 5/0816
See application file for complete search history.

(56) References Cited

U.S. PATENT DOCUMENTS

| | | | |
|---|---|---|---|
| 8,874,301 B1 | 10/2014 | Rao et al. | |
| 9,135,803 B1 * | 9/2015 | Fields | B60K 28/066 |
| 9,238,467 B1 * | 1/2016 | Hoye | B60W 50/14 |
| 9,566,986 B1 * | 2/2017 | Gordon | B60W 50/12 |
| 9,663,118 B1 * | 5/2017 | Palmer | B60W 50/082 |

(Continued)

FOREIGN PATENT DOCUMENTS

WO    2016092796 A1    6/2016

*Primary Examiner* — Behrang Badii
*Assistant Examiner* — David A Testardi
(74) *Attorney, Agent, or Firm* — Muncy, Geissler, Olds & Lowe, P.C.

(57) ABSTRACT

In an embodiment, a vehicle controller determines a predicted driving performance level of a vehicle driving control entity (VDCE) while the vehicle is controlled by a different VDCE. Driving control is transitioned to the VDCE, after which an actual driving performance level of the VDCE is monitored. The vehicle controller determines whether to transition driving control away from the VDCE based on the actual driving performance level. In another embodiment, after transition driving control to a VDCE, a period of heightened scrutiny used to evaluate the actual driving performance level of the VDCE specifically after the transition.

25 Claims, 10 Drawing Sheets

(56) References Cited

U.S. PATENT DOCUMENTS

| | | | | |
|---|---|---|---|---|
| 9,823,657 B1* | 11/2017 | Palmer | .................. | G05D 1/0061 |
| 2012/0046817 A1* | 2/2012 | Kindo | .................. | B60W 30/143 |
| | | | | 701/23 |
| 2014/0303827 A1 | 10/2014 | Dolgov et al. | | |
| 2015/0066284 A1* | 3/2015 | Yopp | ..................... | B60W 30/00 |
| | | | | 701/29.2 |
| 2015/0088357 A1* | 3/2015 | Yopp | ..................... | G05D 1/0061 |
| | | | | 701/23 |
| 2015/0149021 A1* | 5/2015 | Duncan | .................... | A61B 5/18 |
| | | | | 701/23 |
| 2015/0175070 A1* | 6/2015 | Attard | ....................... | B60R 1/00 |
| | | | | 340/439 |
| 2015/0314780 A1* | 11/2015 | Stenneth | ............... | B60W 30/00 |
| | | | | 701/23 |
| 2016/0187879 A1* | 6/2016 | Mere | ..................... | G05D 1/0061 |
| | | | | 701/23 |
| 2016/0202700 A1 | 7/2016 | Sprigg | | |
| 2016/0209840 A1* | 7/2016 | Kim | ....................... | G05D 1/0061 |
| 2017/0038773 A1* | 2/2017 | Gordon | ................ | G05D 1/0061 |
| 2017/0115661 A1* | 4/2017 | Pink | ....................... | G05D 1/0061 |
| 2017/0227959 A1* | 8/2017 | Lauffer | ................ | G05D 1/0088 |
| 2017/0247041 A1* | 8/2017 | Kim | ..................... | B60W 50/082 |
| 2017/0364070 A1* | 12/2017 | Oba | ..................... | G05D 1/0061 |
| 2018/0039268 A1* | 2/2018 | Mangal | ................ | G05D 1/0061 |
| 2018/0043904 A1* | 2/2018 | Cullinane | ............. | G05D 1/0061 |
| 2018/0050704 A1* | 2/2018 | Tascione | ........... | B60W 50/0205 |
| 2018/0118219 A1* | 5/2018 | Hiei | ....................... | B60W 40/09 |

* cited by examiner

MANAGING VEHICLE DRIVING CONTROL ENTITY TRANSITIONS OF AN AUTONOMOUS VEHICLE BASED ON AN EVALUATION OF PERFORMANCE CRITERIA

BACKGROUND

1. Field of the Disclosure

Embodiments relate to managing vehicle driving control entity transitions of an autonomous vehicle based on an evaluation of performance criteria.

2. Description of the Related Art

An autonomous vehicle may be controlled by different vehicle driver control entities. The vehicle driver control entities supported by an autonomous vehicle generally include a human driver in a driver seat of the vehicle or a vehicle electronic control unit (ECU), but can also include remote entities such as a remote human (e.g., operating the autonomous vehicle as a drone over a network connection) or machine (e.g., a server functioning as a remote ECU over a network connection).

From time to time, autonomous vehicles need to implement transitions between vehicle driver control entities. For example, during operation in manual mode, a human driver may wish handoff control to the vehicle ECU (e.g., if the human driver suffers a medical emergency, wants to take a phone call or respond to a text message, wants to go to sleep, etc.), and initiate a user-initiated (or manual) handoff to the vehicle ECU. In another example, during operation in autonomous mode via the vehicle ECU, one or more sensors equipped on the vehicle that report sensor data to the vehicle may suffer performance degradation or may fail outright, which may trigger a machine-initiated handoff to the human driver.

SUMMARY

An embodiment is directed to a method of operating a vehicle controller configured to selectively handoff control of a vehicle configured for autonomous operation between different vehicle driving control entities, including determining a predicted driving performance level of a first vehicle driving control entity based on a first set of performance criteria while a vehicle is being controlled by a second vehicle driving control entity, transitioning driving control of the vehicle from the second vehicle driving control entity to the first vehicle driving control entity, determining an actual driving performance level of the first vehicle driving control entity based on a second set of performance criteria while the vehicle is being controlled by the first vehicle driving control entity, and determining whether to transition driving control of the vehicle from the first vehicle driving control entity to a different vehicle driving control entity based on the actual driving performance level of the first vehicle driving control entity.

Another embodiment is directed to a method of operating a vehicle controller configured to selectively handoff control of a vehicle configured for autonomous operation between different vehicle driving control entities, including transitioning control of a vehicle from a first vehicle driving control entity to a second vehicle driving control entity, initiating, in response to the transitioning, a period of heightened scrutiny during which an actual driving performance level of the second vehicle driving control entity is evaluated based on a first set of performance criteria, and determining whether to transition driving control of the vehicle from the second vehicle driving control entity to a different vehicle driving control entity based on the actual driving performance level of the second vehicle driving control entity.

Another embodiment is directed to a vehicle controller configured to selectively handoff control of a vehicle configured for autonomous operation between different vehicle driving control entities, including at least one processor coupled to a memory and configured to determine a predicted driving performance level of a first vehicle driving control entity based on a first set of performance criteria while a vehicle is being controlled by a second vehicle driving control entity, transition driving control of the vehicle from the second vehicle driving control entity to the first vehicle driving control entity, determine an actual driving performance level of the first vehicle driving control entity based on a second set of performance criteria while the vehicle is being controlled by the first vehicle driving control entity, and determine whether to transition driving control of the vehicle from the first vehicle driving control entity to a different vehicle driving control entity based on the actual driving performance level of the first vehicle driving control entity.

Another embodiment is directed to a vehicle controller configured to selectively handoff control of a vehicle configured for autonomous operation between different vehicle driving control entities, including at least one processor coupled to a memory and configured to transition control of a vehicle from a first vehicle driving control entity to a second vehicle driving control entity, initiate, in response to the transition, a period of heightened scrutiny during which an actual driving performance level of the second vehicle driving control entity is evaluated based on a first set of performance criteria, and determine whether to transition driving control of the vehicle from the second vehicle driving control entity to a different vehicle driving control entity based on the actual driving performance level of the second vehicle driving control entity.

BRIEF DESCRIPTION OF THE DRAWINGS

A more complete appreciation of embodiments of the disclosure will be readily obtained as the same becomes better understood by reference to the following detailed description when considered in connection with the accompanying drawings which are presented solely for illustration and not limitation of the disclosure, and in which.

DETAILED DESCRIPTION

Figure 1:
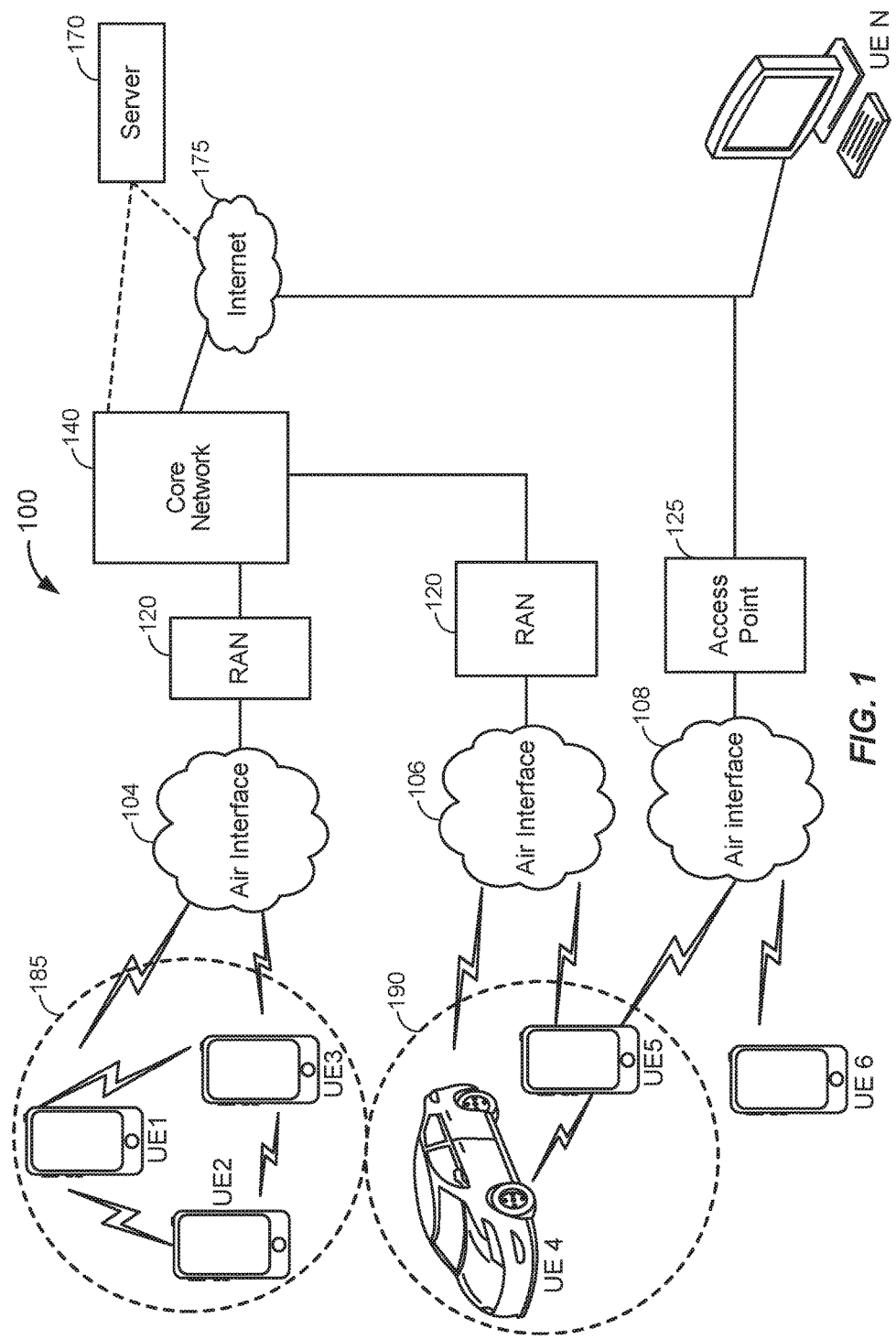
FIG. 1 illustrates a high-level system architecture of a wireless communications system 100 in accordance with an embodiment of the disclosure.

Aspects of the disclosure are disclosed in the following description and related drawings directed to specific embodiments of the disclosure. Alternate embodiments may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any embodiment described herein as "exemplary" and/or "example" is not necessarily to be construed as preferred or advantageous over other embodiments. Likewise, the term "embodiments of the disclosure" does not require that all embodiments of the disclosure include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

A client device, referred to herein as a user equipment (UE), may be mobile or stationary, and may communicate with a wired access network and/or a radio access network (RAN). As used herein, the term "UE" may be referred to interchangeably as an "access terminal" or "AT", a "wireless device", a "subscriber device", a "subscriber terminal", a "subscriber station", a "user terminal" or UT, a "mobile device", a "mobile terminal", a "mobile station" and variations thereof. In an embodiment, UEs can communicate with a core network via the RAN, and through the core network the UEs can be connected with external networks such as the Internet. Of course, other mechanisms of connecting to the core network and/or the Internet are also possible for the UEs, such as over wired access networks, WiFi networks (e.g., based on IEEE 802.11, etc.) and so on. UEs can be embodied by any of a number of types of devices including but not limited to cellular telephones, personal digital assistants (PDAs), pagers, laptop computers, desktop computers, PC cards, compact flash devices, external or internal modems, wireless or wireline phones, and so on. A communication link through which UEs can send signals to the RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). A communication link through which UEs can send signals to other UEs is called a peer-to-peer (P2P) or device-to-device (D2D) channel.

FIG. 1 illustrates a high-level system architecture of a wireless communications system 100 in accordance with an embodiment of the disclosure. The wireless communications system 100 contains UEs 1 . . . N. For example, in FIG. 1, UEs 1 . . . 3, 5 and 6 are illustrated as cellular touchscreen phones or tablet computers, UE 4 is illustrated a vehicle, and UE N is illustrated as a desktop computer or PC.

Referring to FIG. 1, UEs 1 . . . N are configured to communicate with an access network (e.g., a RAN 120, an access point 125, etc.) over a physical communications interface or layer, shown in FIG. 1 as air interfaces 104, 106, 108 and/or a direct wired connection. The air interfaces 104 and 106 can comply with a given cellular communications protocol (e.g., CDMA, EVDO, eHRPD, GSM, EDGE, W-CDMA, 4G LTE, 5G LTE, etc.), while the air interface 108 can comply with a wireless IP protocol (e.g., IEEE 802.11). The RAN 120 may include a plurality of access points that serve UEs over air interfaces, such as the air interfaces 104 and 106. The access points in the RAN 120 can be referred to as access nodes or ANs, access points or APs, base stations or BSs, Node Bs, eNode Bs, and so on. These access points can be terrestrial access points (or ground stations), or satellite access points. The RAN 120 may be configured to connect to a core network 140 that can perform a variety of functions, including bridging circuit switched (CS) calls between UEs served by the RAN 120 and other UEs served by the RAN 120 or a different RAN altogether, and can also mediate an exchange of packet-switched (PS) data with external networks such as Internet 175.

The Internet 175, in some examples, includes a number of routing agents and processing agents (not shown in FIG. 1 for the sake of convenience). In FIG. 1, UE N is shown as connecting to the Internet 175 directly (i.e., separate from the core network 140, such as over an Ethernet connection of WiFi or 802.11-based network). The Internet 175 can thereby function to bridge packet-switched data communications between UEs 1 . . . N via the core network 140. Also shown in FIG. 1 is the access point 125 that is separate from the RAN 120. The access point 125 may be connected to the Internet 175 independent of the core network 140 (e.g., via an optical communications system such as FiOS, a cable modem, etc.). The air interface 108 may serve UE 5 or UE 6 over a local wireless connection, such as IEEE 802.11 in an example. UE N is shown as a desktop computer with a wired connection to the Internet 175, such as a direct connection to a modem or router, which can correspond to the access point 125 itself in an example (e.g., for a WiFi router with both wired and wireless connectivity).

Referring to FIG. 1, a server 170 is shown as connected to the Internet 175, the core network 140, or both. The server 170 can be implemented as a plurality of structurally separate servers, or alternately may correspond to a single server. The server 170 may correspond to any type of server, such as a web server (e.g., hosting a web page), an application download server, or an application server that supports particular communicative service(s), such as Voice-over-Internet Protocol (VoIP) sessions, Push-to-Talk (PTT) sessions, group communication sessions, social networking services, etc. In another example, as will be described below in more detail, the server 170 may correspond to a remote driving control platform to facilitate remote driving control of a vehicle (e.g., a remote electronic control unit (ECU), or a machine such as a driving simulator console that permits a human in a remote facility to remotely drive a vehicle).

Referring to FIG. 1, UEs 1 . . . 3 are depicted as part of a D2D network or D2D group 185, with UEs 1 and 3 being connected to the RAN 120 via the air interface 104. In an embodiment, UE 2 may also gain indirect access to the RAN 120 via mediation by UEs 1 and/or 3, whereby data 'hops' to/from UE 2 and one (or more) of UEs 1 and 3, which communicate with the RAN 120 on behalf of UE 2. Further, UEs 4 and 5 are depicted as part of a D2D network or D2D group 190, with UEs 4 and 5 each being connected to the RAN 120 via the air interface 106, with UE 5 further being connected to the access point 125 over the air interface 108. In an example, UE 5 may be a smart phone or tablet computer that is connected to UE 4 via an in-vehicle D2D communication link (e.g., vehicle Bluetooth, etc.).

Figure 2:
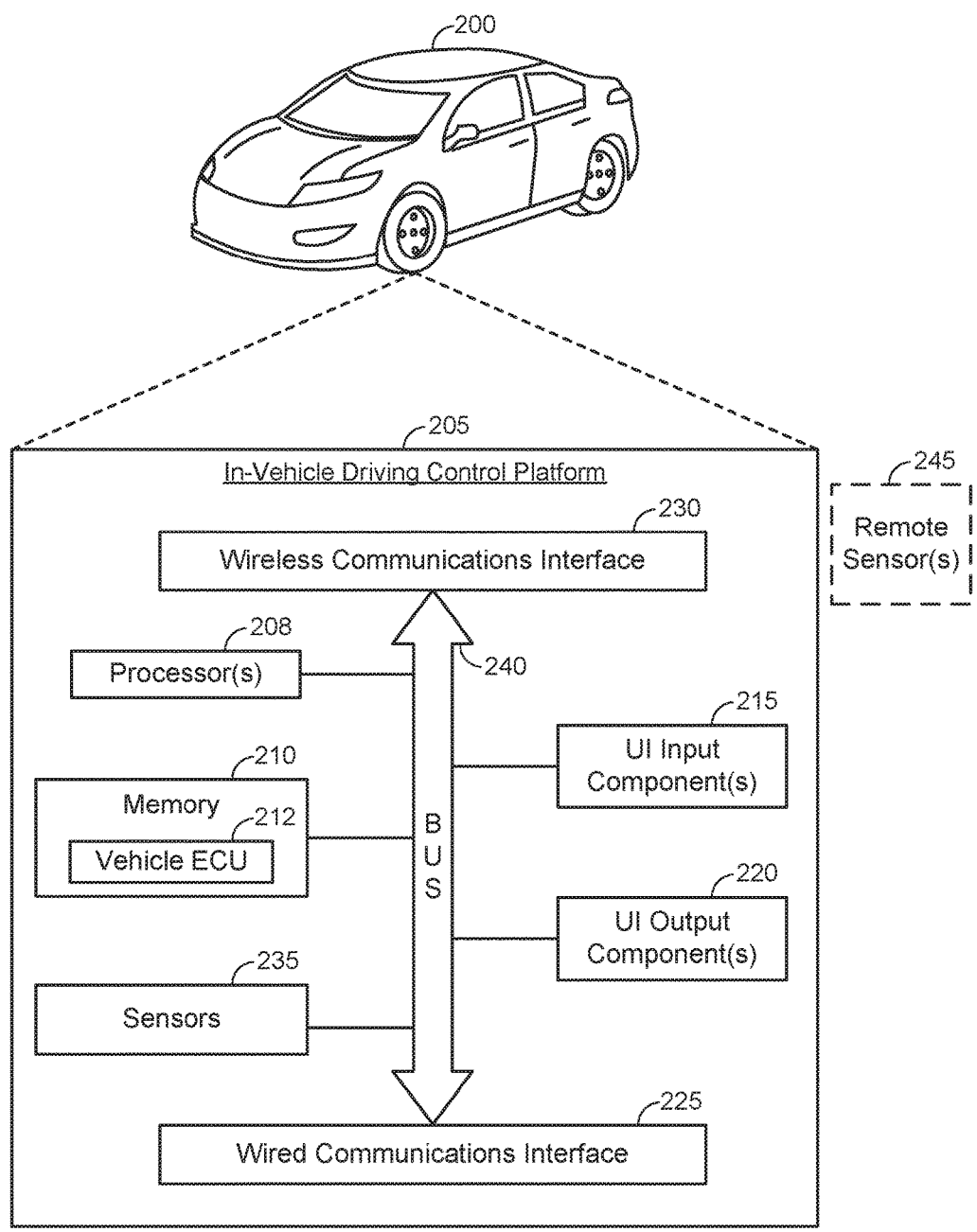
FIG. 2 illustrates a vehicle that includes an in-vehicle driving control platform that includes various components in accordance with an embodiment of the disclosure.

FIG. 2 illustrates a vehicle 200 that includes an in-vehicle driving control platform 205 that includes various components in accordance with an embodiment of the disclosure. The in-vehicle driving control platform 205 includes any component that is part of (or coupled to) the vehicle 200 that may be leveraged in association with an autonomous driving mode of the vehicle 200, including components for executing autonomous driver mode via a local vehicle ECU, for executing a local human-controlled drive mode, a remote driver mode (e.g., a remote ECU or remote human driver) and for implementing transitions between any of the above-noted driver modes.

Referring to FIG. 2, the in-vehicle driving control platform 205 one or more processor(s) 208 (e.g., one or more ASICs, one or more digital signal processors (DSPs), etc.) and a memory 210 (e.g., RAM, ROM, EEPROM, flash cards, or any memory common to computer platforms). The in-vehicle driving control platform 205 also includes one or more UI input components 215 (e.g., a touchscreen control interface, one or more physical buttons such as volume, power buttons, AM/FM radio tune buttons, temperature/fan controls, one or more microphones, steering wheel-mounted control buttons, etc.) and one or more UI output components 220 (e.g., an instrument control panel, a touchscreen control interface or media center, in-vehicle speakers, etc.). The memory 210 includes a vehicle ECU 212 that is executable by the processor(s) 208 and, upon execution, is configured to interact with other components of the in-vehicle driving control platform 205 to implement an autonomous or self-driving mode for the vehicle 200. The vehicle ECU module 212 may also include a proxy or remote control function, which permits data to be passed to an external driving control entity (e.g., a remote ECU or human controller) and to receive driving commands from the external driving control entity.

The in-vehicle driving control platform 205 further includes a wired communications interface 225 and a wireless communications interface 230. In an example embodiment, the wired communications interface 225 can be used to support wired local connections to peripheral devices (e.g., a USB connection, a headphone jack, graphics ports such as serial, VGA, HDMI, DVI or DisplayPort, and so on). In another example embodiment, the wireless communications interface 230 includes one or more wireless transceivers for communication in accordance with a local or D2D wireless communications protocol (e.g., WLAN or WiFi, WiFi Direct, Bluetooth, etc.). In a specific example, D2D wireless communications protocols supported by the wireless communications interface 230 may include a vehicle-to-vehicle (V2V) protocol to support communications with one or more other vehicles, a vehicle-to-infrastructure (V2I) protocol to support communications with traffic or roadway infrastructure, and/or a vehicle-to-pedestrian (V2P) protocol to support communications with personal devices (or UEs) carried by pedestrians. The wireless communications interface 230 may also include one or more wireless transceivers for communication with a cellular RAN (e.g., via CDMA, W-CDMA, time division multiple access (TDMA), frequency division multiple access (FDMA), Orthogonal Frequency Division Multiplexing (OFDM), GSM, or other protocols that may be used in a wireless communications network or a data communications network).

Referring to FIG. 2, the in-vehicle driving control platform 205 further includes sensors 235 which are in proximity to (or local to) the vehicle 200. The sensors 235 may be physically integrated into the vehicle 200 by the manufacturer, or alternatively may be mounted onto the vehicle 200 in some manner (e.g., video cameras bolted onto an external chassis of the vehicle 200 by an end-user or device-tester, etc.). Alternatively, the sensors 235 may be in an environment of the vehicle 200 without physical integration (e.g., a wearable sensor attached to a human driver that is currently in a driver's seat of the vehicle 200). The sensors 235 include any type of sensor that can be used to monitor any condition that may be factored into the execution of an ECU-based autonomous driving mode and/or any condition that may be factored into a vehicle driving control entity transition decision (e.g., a condition indicative of predicted or actual driving performance, etc.). The sensors 235 may include any combination of the following:

- A set of video cameras configured to capture an external environment of the vehicle;
- A set of video cameras configured to capture an internal environment of the vehicle;
- One or more biometric sensors configured to track biometric data of a human in a driver's seat of the vehicle 200 (e.g., heart-rate, whether the human is awake or asleep, whether the human's eyes are open, whether the human is inebriated, etc.);
- One or more wearable sensors (e.g., heart-rate sensor, electrocardiogram sensor, continuous glucose monitoring sensor, etc.) worn by the human in the driver's seat;
- One or more "soft" sensors (e.g., diagnostic software) to gauge a health or fitness of the vehicle ECU 212;
- One or more speedometers;
- One or more tire pressure sensors;
- One or more satellite positioning system (SPS) antennas (e.g., GPS antennas) configured to detect SPS signals for determining a location of the vehicle 200;
- Laser-based (e.g., LIDAR) and/or radar object detectors; and/or
- An inertial measurement unit (IMU) that includes a set of gyroscopes and a set of accelerometers to detect relative motion of the vehicle 200.

The various components 208-235 of the in-vehicle driving control platform 205 can communicate with each other via a bus 240. Some or all of the components 208-235 may be utilized as part of the vehicle ECU for controlling the vehicle 200 during an autonomous or self-driving mode of operation, based in part upon vehicle ECU software stored in the memory 210.

While the sensors 235 are part of the in-vehicle driving platform 205, one or more remote sensors 245 can also be deployed. The one or more remote sensors 245 can include any of the following:

One or more biometric and/or wearable sensors (e.g., heart-rate sensor, electrocardiogram sensor, continuous glucose monitoring sensor, etc.) worn by a human at a location remote from the vehicle 200 (e.g., a human available to perform a remote driving function of the vehicle 200);

One or more "soft" sensors (e.g., diagnostic software) to gauge a health or fitness of a remote ECU; and/or A network connection performance monitor to assess performance metrics (e.g., network propagation delay, jitter, historical connection performance, etc.) of a connection between a remote entity (e.g., remote ECU, remote human driver console, etc.) and the vehicle 200.

Figure 3:
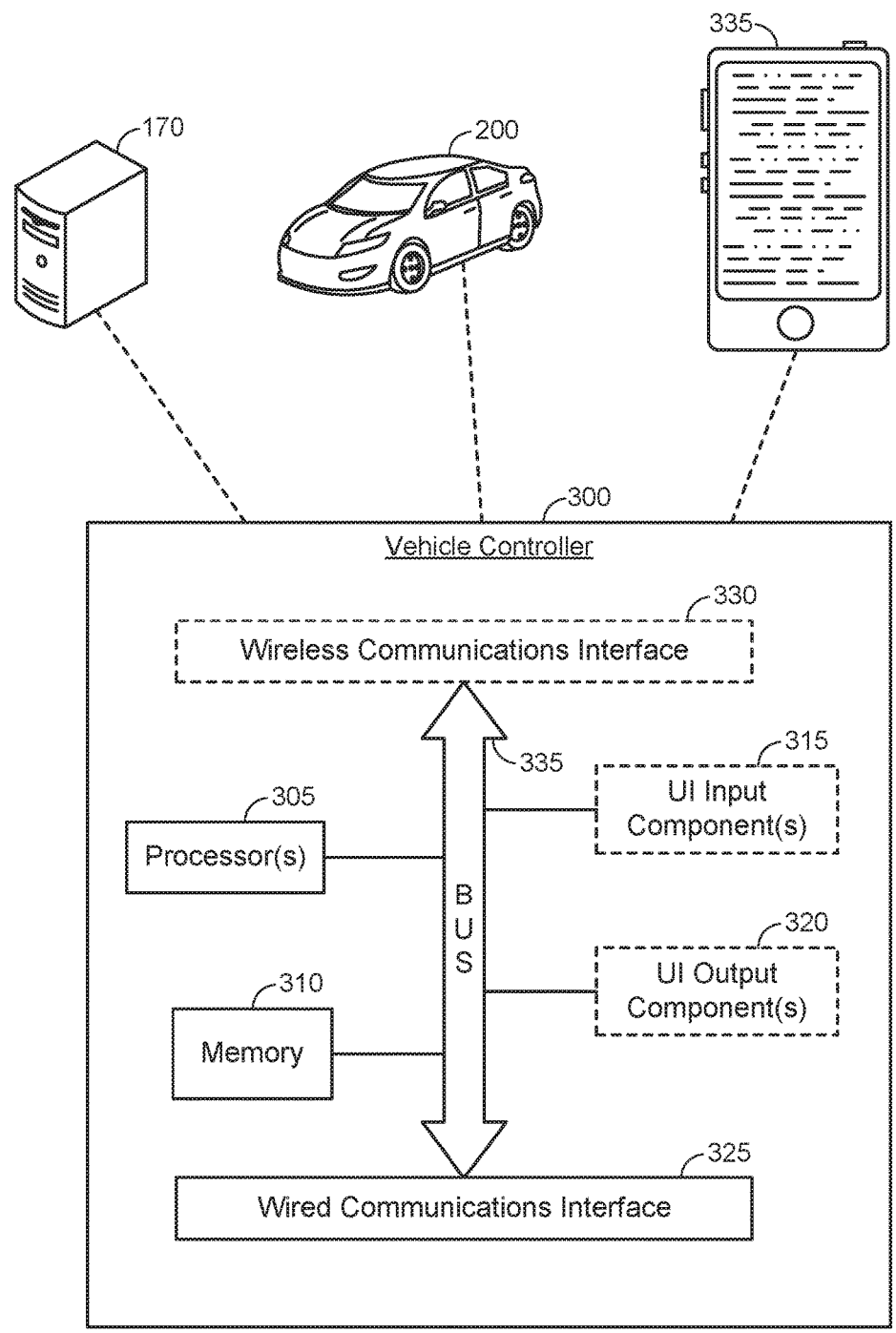
FIG. 3 illustrates a vehicle controller that includes various components in accordance with an embodiment of the disclosure.

FIG. 3 illustrates a vehicle controller 300 that includes various components in accordance with an embodiment of the disclosure. The vehicle controller 300 refers to the device that makes decisions regarding which vehicle driving control entity should be in control of the vehicle 200 at any given time. In an example, the vehicle controller 300 may be part of the in-vehicle driving control platform 205 itself, in which case the various component described below may overlap at least in part with the components of the in-vehicle driving control platform 205 described above with respect to FIG. 2. However, the vehicle controller 300 could alternatively correspond to a remote server (e.g., server 170) or a UE 335 connected to the vehicle 200 via a D2D connection. If the vehicle controller 300 is not part of the in-vehicle driving control platform 205, sensor data collected by the sensors 230 of the in-vehicle driving control platform 205 may be forwarded to the vehicle controller 230 using the wired and/or wireless communication interfaces 225 and 230 to assist the vehicle controller 230 with respect to making a decision regarding which vehicle driving control entity should be in control of the vehicle 200.

Referring to FIG. 3, the vehicle controller 305 includes one or more processors 305 (e.g., one or more ASICs, one or more DSPs, etc.) and a memory 310 (e.g., RAM, ROM, EEPROM, flash cards, or any memory common to computer platforms). The vehicle controller 300 optionally includes one or more UI input components 315 (e.g., a keyboard, a mouse, a touchscreen, any of the vehicle-specific UI input components 315 described above with respect to FIG. 2, etc.) and/or one or more UI output components 320 (e.g., any of the vehicle-specific UI input components 315 described above with respect to FIG. 2, etc.). In an example, the one or more UI input components 315 and/or the one or more UI output components may be omitted for a server implementation of the vehicle controller 305, which is one reason why these components are described as optional with respect to FIG. 3.

The vehicle controller 300 further includes a wired communications interface 325 and (optionally) a wireless communications interface 330. In an example embodiment, the wired communications interface 325 can be used to support wired local connections to peripheral devices (e.g., a USB connection, a headphone jack, graphics ports such as serial, VGA, HDMI, DVI or DisplayPort, and so on). In another example, such as in a server implementation of the vehicle controller 305, the wired communications interface 325 may include one or more wired ports (e.g., Ethernet ports or CAT8 ports) to support a backhaul or Internet connection. In another example embodiment (e.g., for a UE or in-vehicle implementation of the vehicle controller 300), the wireless communications interface 330 includes one or more wireless transceivers for communication in accordance with a local or D2D wireless communications protocol (e.g., WLAN or WiFi, WiFi Direct, Bluetooth, etc.). In an example, if the vehicle controller 300 corresponds to the vehicle 200, then the D2D wireless communications protocols supported by the wireless communications interface 230 may include a V2V protocol to support communications with one or more other vehicles, a V2I protocol to support communications with traffic or roadway infrastructure, and/or a V2P protocol to support communications with personal devices (or UEs) carried by pedestrians.

The wireless communications interface 330 may also include one or more wireless transceivers for communication with a cellular RAN (e.g., via CDMA, W-CDMA, TDMA, FDMA, OFDM, GSM, or other protocols that may be used in a wireless communications network or a data communications network). The various components 305-330 of the vehicle controller 300 can communicate with each other via a bus 335.

Figure 4:
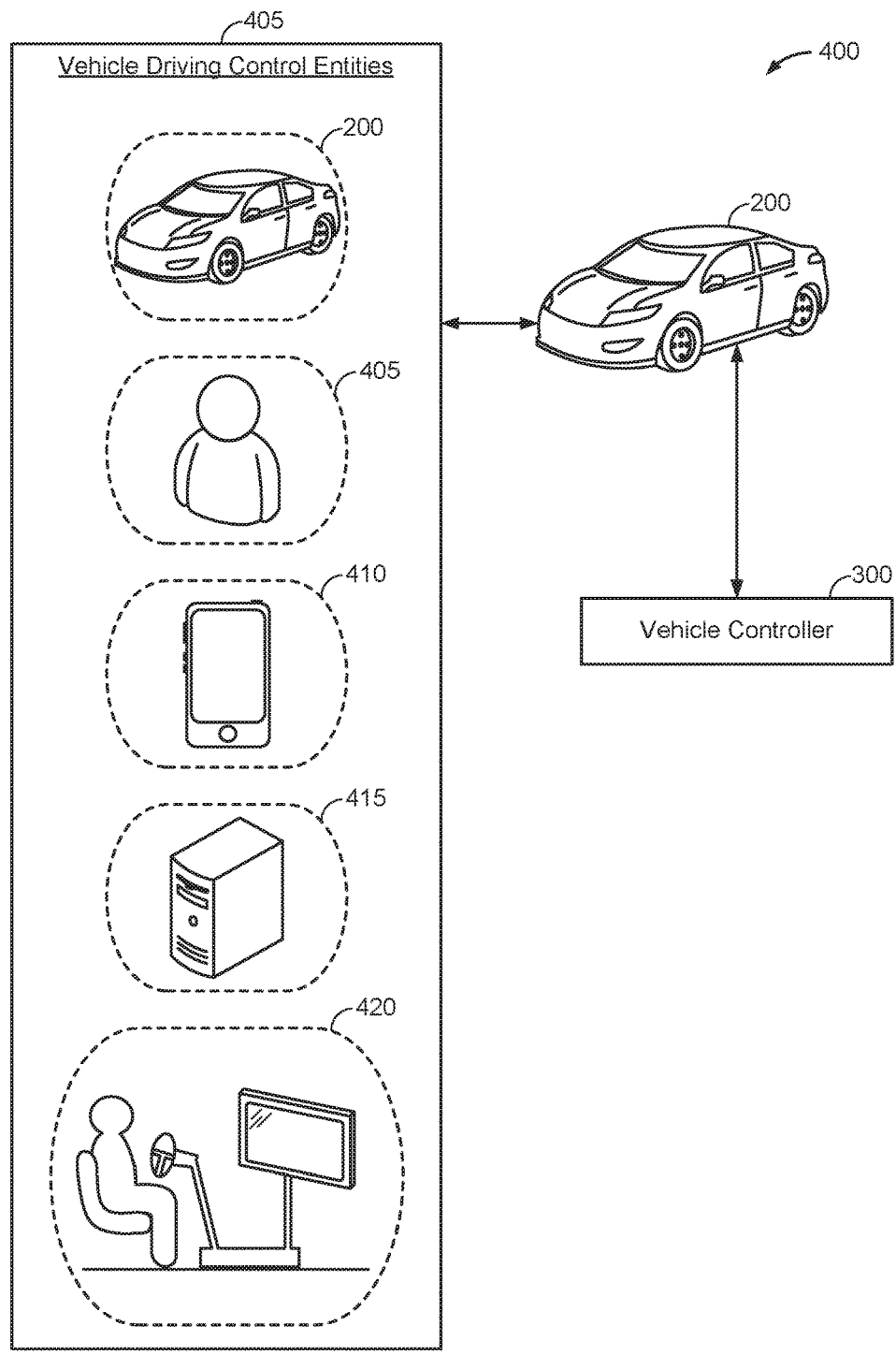
FIG. 4 illustrates an autonomous vehicle control environment in accordance with an embodiment of the disclosure.

FIG. 4 illustrates an autonomous vehicle control environment 400 in accordance with an embodiment of the disclosure. Referring to FIG. 4, the vehicle controller 300 is shown in communication with the vehicle 200 which in turn is in communication with a group of potential vehicle driving control entities 405. The group of potential vehicle driving control entities 405 includes the vehicle 200 (or more particularly, a vehicle ECU provisioned on the vehicle 200 as part of the in-vehicle driving control platform 205), a human driver 405 (e.g., a human seated in a driver's seat of the vehicle 200), a UE 410 (e.g., a D2D-connected UE in the vehicle 200, a remote UE, etc.), a remote server 415 (e.g., the server 170, etc.) and a remote human 420 that can remotely control the vehicle 200 via some type of driving simulator console. As noted above, the vehicle controller 300 can potentially be integrated as part of the in-vehicle driving control platform 205 and one of the potential vehicle driving control entities 405 corresponds to the vehicle 200, so in certain implementations the entire autonomous vehicle control environment 400 may be self-contained within the vehicle 200.

From time to time, autonomous vehicles need to implement transitions between vehicle driver control entities. For example, during operation in manual mode, a human driver may wish handoff control to the vehicle ECU (e.g., if the human driver suffers a medical emergency, wants to take a phone call or respond to a text message, wants to go to sleep, etc.), and initiate a user-initiated (or manual) handoff to the vehicle ECU. In another example, during operation in autonomous mode via the vehicle ECU, one or more sensors equipped on the vehicle that report sensor data to the vehicle may suffer performance degradation or may fail outright, which may trigger a machine-initiated handoff to the human driver.

Embodiments of the disclosure thereby relate to managing vehicle driving control entity transitions of an autonomous vehicle based on an evaluation of performance criteria, as will be described below with respect to FIGS. 5-10.

Figure 5:
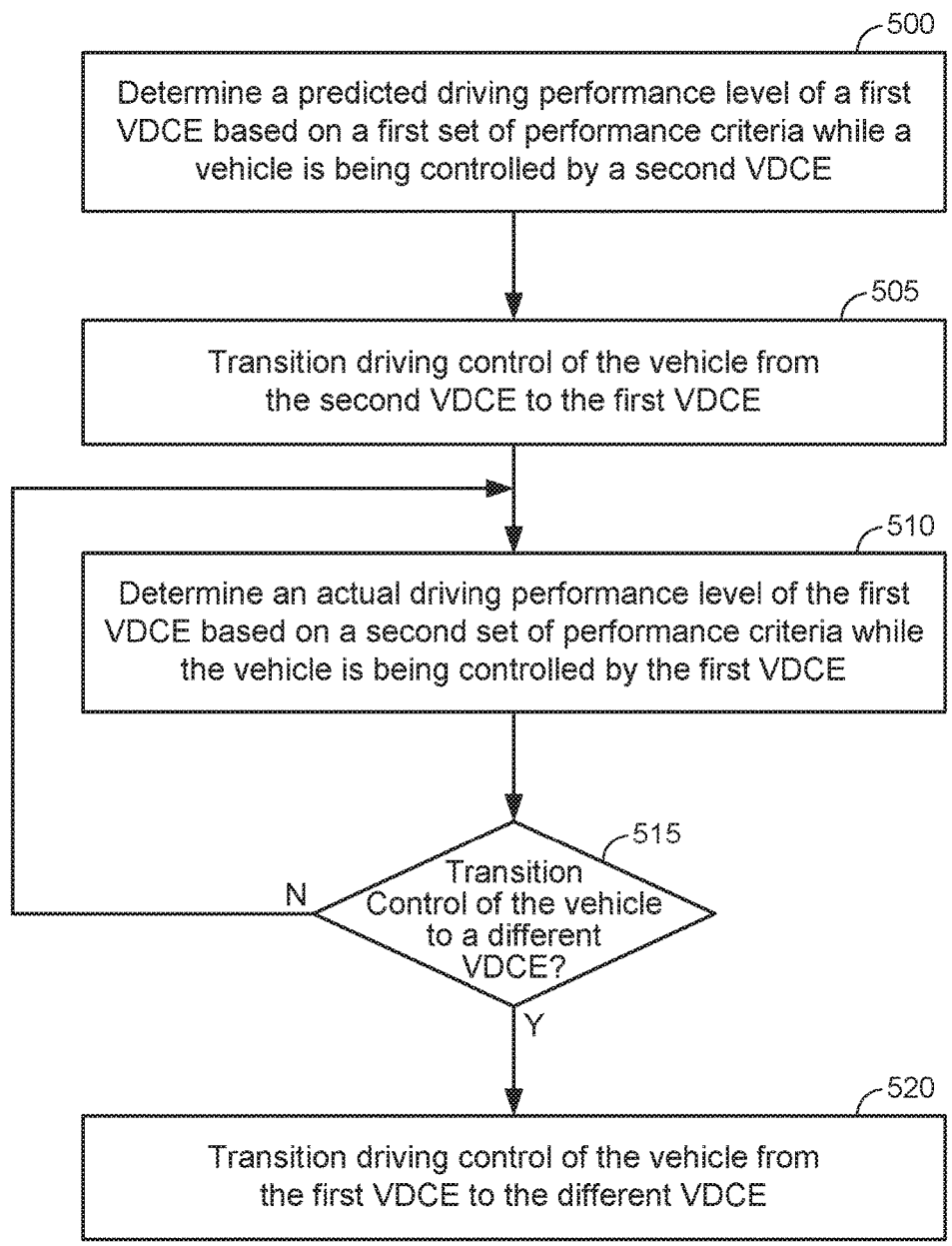
FIG. 5 illustrates a process of selectively transitioning a vehicle driving control entity of a vehicle in accordance with an embodiment of the disclosure.

FIG. 5 illustrates a process of selectively transitioning a vehicle driving control entity of a vehicle (e.g., vehicle 200) in accordance with an embodiment of the disclosure. The process of FIG. 5 is performed by a vehicle controller, such as the vehicle controller 300 of FIG. 3, which may correspond to the vehicle 200 itself (or more particularly, the in-vehicle driving control platform 205 of the vehicle 200), a remote server, a local D2D-connected UE or a remote UE.

Referring to FIG. 5, at block 500, the vehicle controller evaluates a predicted driving performance level of a first vehicle driving control entity based on a first set of performance criteria while a vehicle is being controlled by a second vehicle driving control entity. The predicted performance level of the first vehicle driving control entity may be determined at block 500 in a number of different ways as will be described in more detail. At block 505, the vehicle controller initiates a transition of driving control of the vehicle from the second vehicle driving control entity to the first vehicle driving control entity. In an example, the transition of block 505 may be triggered in a variety of ways, such as a manual request from a user (e.g., a human in a driver's seat of the vehicle wants to go to sleep and end manual driving mode, or the human in the driver's seat wants to take over and resume manual driving mode while the vehicle is operating in an autonomous mode, etc.), or a detection that the first vehicle driving control entity is more suitable to drive the vehicle (e.g., the predicted driving performance level from block 500 rises above a threshold, an actual or predicted driving performance of the second vehicle driving control entity drops below a threshold, the second vehicle driving control entity becomes unavailable, etc.).

Referring to FIG. 5, after the transition of driving control to the first vehicle driving control entity at block 505, the vehicle controller determines an actual driving performance level of the first vehicle driving control entity based on a second set of performance criteria while the vehicle is being controlled by the first vehicle driving control entity. In an example, the first set of performance criteria used to determine the predicted driving performance level at block 500 may be the same or different from the second set of performance criteria used to determine the actual driving performance level at block 510. The determination of block 510 may be part of an ongoing driving entity monitoring function that is performed so long as the first vehicle driving control entity maintains driving control over the vehicle.

In a further example, the first and second sets of performance criteria may include some of the same parameters with different applicable thresholds. For example, for the parameter of heart-rate of a human driver, the first set of performance criteria may establish a safe heart-rate range of 50-90 beats per minute (BPM), with the assumption that a BPM lower than 50 is an indication that the human driver may be asleep while a BPM higher than 90 BPM is indicative that the human driver is undergoing some type of stress. The second set of performance criteria need not use the same heart-rate range as the first set of performance criteria because gauging actual driving performance can be different than gauging predicted driving performance. For example, various spikes in heart-rate may be expected while the human driver is in control (e.g., the human driver is cut off by another car, causing a brief spike in heart-rate, etc.), so a larger safe heart-rate range (e.g., 50-115 BPM) may be implemented. Additional examples of how the predicted and actual driving performance levels may be determined at blocks 500 and 510 will be provided below in more detail.

Referring to FIG. 5, at block 515, the vehicle controller determines whether to transition control of the vehicle to a different vehicle driving control entity (e.g., either back to the second vehicle driving control entity or a third vehicle driving control entity). For example, the vehicle controller may determine to transition control of the vehicle to a different vehicle driving control entity if the actual driving performance level of the first vehicle driving control entity is below a performance threshold (or required fitness score) and there is at least one other vehicle driving control entity that is available and has a predicted driving performance level that is higher than the actual driving performance level of the first vehicle driving control entity, the performance threshold, or both. If the vehicle controller determines not to transition control of the vehicle to a different vehicle driving control entity at block 515, the process returns to block 510 and the vehicle controller continues to monitor the actual driving performance level of the first vehicle driving control entity. Alternatively, if the vehicle controller determines to transition control of the vehicle to the different vehicle driving control entity at block 515, the vehicle controller initiates a transition of driving control of the vehicle from the first vehicle driving control entity to the different vehicle driving control entity at block 520. In an example, the different vehicle driving control entity to which driving control is transitioned at block 520 may correspond to a vehicle driving control entity with a highest predicted driving performance level among available vehicle driving control entities.

Referring to FIG. 5, one manner in which the predicted driving performance level determined at block 500 and the actual driving performance level determined at block 510 can be expressed are as fitness metrics (or fitness scores). A fitness score is a value that can be compared against one or more dynamic thresholds to facilitate a vehicle driving control entity transition (or handoff) decision.

Figure 6:
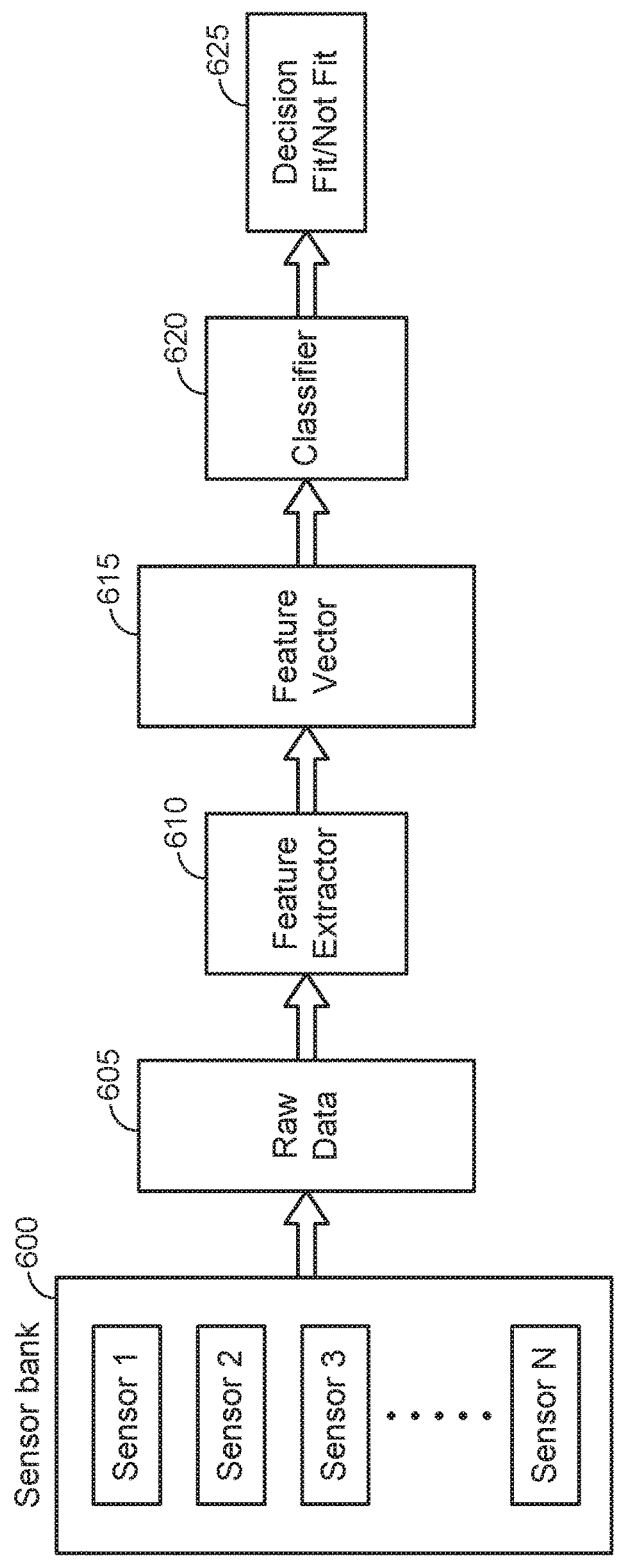
FIG. 6 illustrates a process of using a fitness score to make a vehicle driving control entity transition (or handoff) decision in accordance with an embodiment of the disclosure.

FIG. 6 illustrates a process of using a fitness score to make a vehicle driving control entity transition (or handoff) decision in accordance with an embodiment of the disclosure. The process of FIG. 6 may be executed during the process of FIG. 5 at block 500 to determine the predicted performance level and/or at blocks 510-515 to determine the actual driving performance level and make a transition decision.

Referring to FIG. 6, a sensor bank (e.g., corresponding to sensors 235 of FIG. 2) containing sensors 1 . . . N provide raw sensor data 605 associated with a particular vehicle driving control entity under evaluation to the vehicle controller. The vehicle controller processes the raw data via a feature extractor module 610 to produce a feature vector 615 that is input to a classifier 620. The classifier 620 analyzes the feature vector 615 and makes the ultimate decision regarding whether a particular vehicle driving control entity is fit to drive the vehicle, which is output by the classifier 620 at block 625. In more detail, the classifier 620 makes the fit or unfit determination based on a fitness score that is calculated for the vehicle driving control entity using the feature vector 615. The classifier 620 may also consider secondary factors, such as the fitness scores for other available vehicle driving control entities. In an example, the decision at block 625 may be a binary indicator (e.g., 0=fit, 1=unfit).

The feature vector 615 may provide a variety of different information to the classifier 620 to generate the fitness score. The type of information contained in the feature vector 615 may vary based on the nature of the particular vehicle driving control entity being evaluated. For example, if the vehicle driving control entity is a human driver, the feature vector 615 may indicate information characterizing predicted or actual human driver performance, such as information related to the human driver's face (e.g., eye glaze, eyes being closed, drool coming out of mouth, or other sleepiness indicators), medical condition (e.g., extremely high or low heart-rate, etc.), vital signs (e.g., rate of breathing, blood pressure, etc.), head position (e.g., if resting on shoulder, human driver may be asleep, etc.), whether the user is snoring, and so on. Various sensors can be used to generate the human-specific feature vector 615, such as interior video cameras, interior microphone, biometric sensors such as a heart-rate monitor that may be attached to (or worn by) the human driver or coupled to the vehicle, and so on. In another example, if the vehicle driving control entity is a vehicle ECU, the feature vector 615 may indicate information characterizing predicted or actual vehicle ECU performance, such as the operational status of critical sensors (e.g., LIDAR, etc.), telematics, current network coverage, etc. Some components of the feature vector 615 may be relevant to any vehicle driving control entity type, such as GPS data, road conditions, traffic data, road signs, 911/emergency beacons, and so on. For remote vehicle driving control entities, current network propagation delay may be of particular importance and weighted more heavily in the fitness score.

As noted above, the fitness score of a particular vehicle driving control entity may be compared against one or more dynamic thresholds to make the fit/unfit decision output at block 625 by the classifier 620. The dynamic threshold can be dynamic in the sense that real-time information is factored, such as current road conditions. In an example, assume that a human driver is tired and shows signs of sleepiness, which contributes to a relatively low fitness score. However, further assume that the vehicle is heading into a particular stretch of road where human drivers have historically been superior to vehicle ECUs, causing the dynamic threshold for the human driver to be weighted lower. The human driver may normally be deemed unfit to drive due to his/her tiredness, but may be deemed fit to drive in this particular scenario due to the weighting of the dynamic threshold that accounts for the relatively weak vehicle ECU performance on this particular road section.

Factors that may impact predicted fitness scores, actual fitness scores and/or dynamic thresholds for a particular vehicle driving control entity may include any of the following:
  Current road and/or weather conditions (e.g., raining, snowing, roads are icy, strong sun glare that may lower the contrast of images captured by video cameras, etc.);
  Road type (e.g., rural highway, downtown city with lots of lights, etc.);
  Traffic level (e.g., traffic jams during rush hour, etc.);
  Historical driving performance (e.g., overall historical driving performance, historical driving performance in a particular region or under particular road conditions);
  For remote vehicle driving control entities, a network connection speed and/or reliability;
  For a human driver, human-centric factors (e.g., is the human driver sleepy, tired, distressed, using his/her phone in a distracting manner, etc.);
  For a vehicle ECU, a current status of various sensors (e.g., whether LIDAR system functioning normally, etc.);
  A speed at which other cars are driving on the road; and/or
  A projected navigation route (e.g., if the human driver enters a target destination for the vehicle for navigation, are particular areas of the navigation route more suitable for particular vehicle driving control entity types?).

The factors noted above may be used to weigh the fitness scores, the dynamic thresholds or both. For example, the factor of a speed at which other cars are driving on the road may increase the dynamic threshold because the accident risk is increased. If a particular vehicle driving control entity is known to be particularly good or bad under high-speed conditions, then the speed factor can be used to weight the associated fitness score as well (while the fitness scores for vehicle driving control entities without any known speed-specific capabilities would not be impacted). Other examples of how fitness scores and dynamic thresholds can be factored into the fit/unfit decision will be described below in more detail.

The process depicted in FIG. 6 may be run continuously, periodically, or in response to particular triggering events (e.g., when a vehicle driving control entity transition is manually requested, when the vehicle controller determines that a current vehicle driving control entity is unfit and needs to find another suitable vehicle driving control entity, etc.). If run periodically, a frequency at which the process of FIG. 6 is executed may vary in different situations. For example, as will be discussed below with respect to FIG. 7, the frequency of the process of FIG. 6 may be executed at a heightened frequency with respect to a new vehicle driving control entity immediately following a vehicle driving control entity transition. The heightened frequency in this case may function as an extra precaution to ensure that a predicted driving performance level that led to the new vehicle driving control entity being found fit to drive the vehicle is commensurate with the actual driving performance level of the new vehicle driving control entity.

While the process of FIG. 5 focuses on evaluations of predicted and actual performance levels in association with a vehicle driving control entity transition based on respective sets of performance criteria, in other embodiments, the performance criteria used to gauge an actual driving performance level of the vehicle driving control entity may be different based on how recently the vehicle driving control entity was transitioned, as will be discussed below with respect to FIG. 7.

Figure 7:
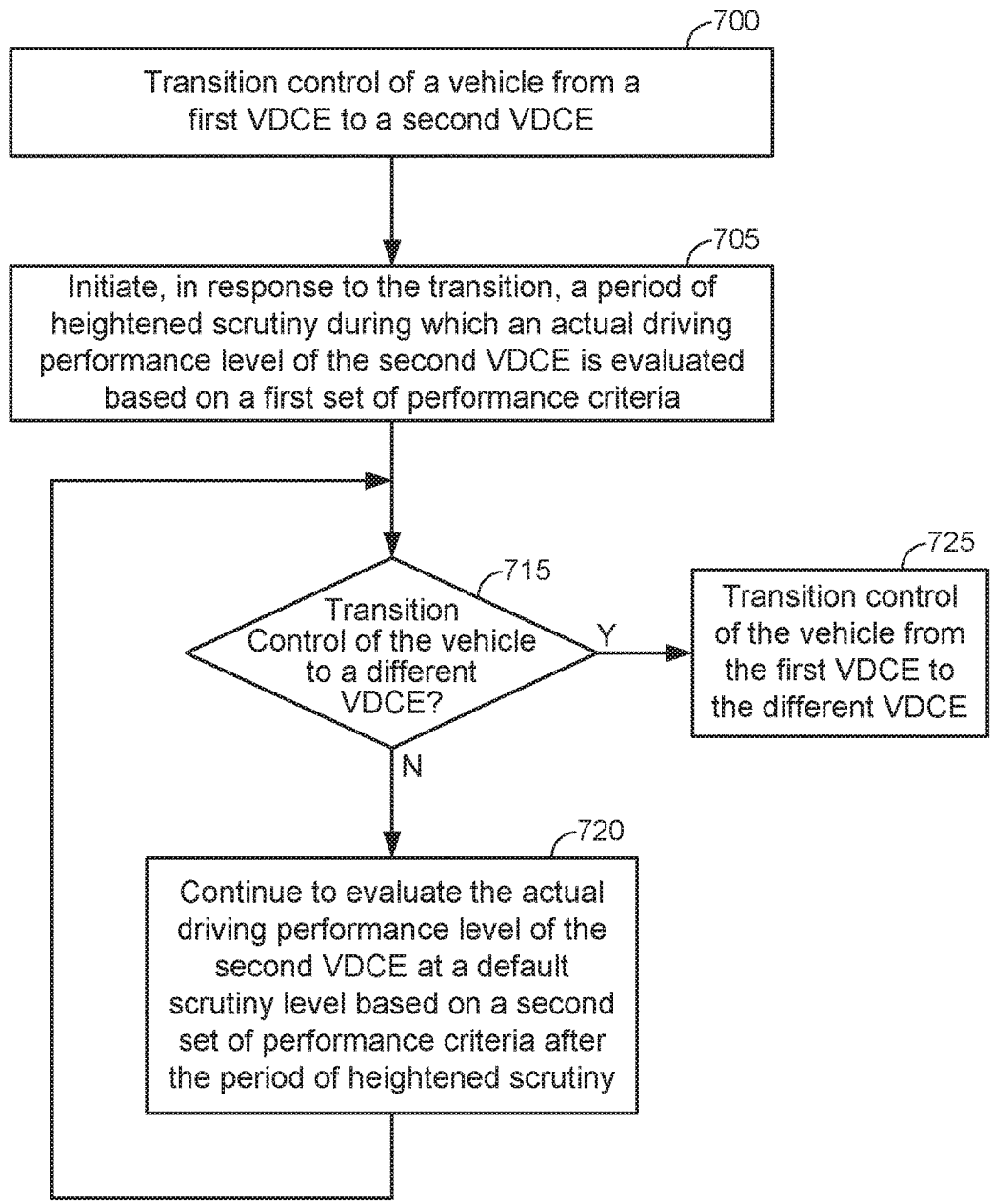
FIG. 7 illustrates a process of selectively transitioning a vehicle driving control entity of a vehicle in accordance with another embodiment of the disclosure.

FIG. 7 illustrates a process of selectively transitioning a vehicle driving control entity of a vehicle (e.g., vehicle 200) in accordance with another embodiment of the disclosure. In an example, the process of FIG. 7 may execute in conjunction with the process of FIG. 5, but the processes of FIGS. 5 and 7 can also be implemented separately. Similar to FIG. 5, the process of FIG. 7 is performed by a vehicle controller, such as the vehicle controller 300 of FIG. 3, which may correspond to the vehicle 200 itself (or more particularly, the in-vehicle driving control platform 205 of the vehicle 200), a remote server, a local D2D-connected UE or a remote UE.

Referring to FIG. 7, at block 700, the vehicle controller initiates a transition of driving control of the vehicle from a first vehicle driving control entity to a second vehicle driving control entity. In an example, the transition of block 700 may be triggered in a variety of ways, such as a manual request from a user (e.g., a human in a driver's seat of the vehicle wants to go to sleep and end manual driving mode, or the human in the driver's seat wants to take over and resume manual driving mode while the vehicle is operating in an autonomous mode, etc.), or a detection that the second vehicle driving control entity is more suitable to drive the vehicle. In an example, the transition of block 700 may correspond to any of the transitions described above with respect to blocks 505 or 520 of FIG. 5.

Referring to FIG. 7, at block 705, the vehicle controller initiates, in response to the transition, a period of heightened scrutiny during which an actual driving performance level of the second vehicle driving control entity is evaluated based on a first set of performance criteria. As an example, the period of heightened scrutiny can correspond to a period where the process of FIG. 6 executes more frequently to track the fitness score of the second vehicle driving control entity with more precision (relative to a default frequency). In another example, the vehicle controller may evaluate different performance criteria altogether during the period of heightened scrutiny relative to default performance criteria, as will be discussed below in more detail.

The period of heightened scrutiny may be considered a type of fitness test that the second vehicle driving control entity must pass to maintain control over the vehicle. In an example, if the second vehicle driving control entity is a human driver, the fitness test may evaluate factors such as an amount of force on steering wheel, monitoring driver alertness and stress levels and/or an in-depth evaluation of high-level driving decisions (e.g., is the human driver changing lanes unnecessarily or too frequently or otherwise driving erratically). In another example, if the second vehicle driving control entity is a non-human driver (e.g., a vehicle ECU, a remote ECU, etc.), the human driver may be notified with respect to various driving events (e.g., a difficult driving scenario, uncertain autonomous moves of the vehicle, etc.) and kept on-notice in case the human driver needs to take over control of the vehicle. In an example, any request by the human driver to take back control of the vehicle during a period of heightened scrutiny of a non-human driver may be interpreted as an urgent trigger by the vehicle controller, so that the human driver can immediately seize control in an emergency situation where the non-machine driving is malfunctioning.

Referring to FIG. 7, at block 715, the vehicle controller determines whether to transition control of the vehicle to a different vehicle driving control entity based on an evaluation of the first set of performance criteria during the period of heightened scrutiny. If the vehicle controller determines to transition control of the vehicle to a different vehicle driving control entity based on the evaluation of the first set of performance criteria during the period of heightened scrutiny at block 715, then at block 720, the vehicle controller initiates a transition of driving control of the vehicle from the second vehicle driving control entity to the different vehicle driving control entity (e.g., back to the first vehicle driving control entity or to a third vehicle driving control entity). In an example, the transition of block 725 may cause initiation of another period of heightened scrutiny to validate the actual driving performance level of the new vehicle driving control entity.

Referring to FIG. 7, if the vehicle controller determines not to transition control of the vehicle to a different vehicle driving control entity based on the evaluation of the first set of performance criteria during the period of heightened scrutiny at block 715, then at block 720, the vehicle controller continues to evaluate the actual driving performance level of the second vehicle driving control entity at a default scrutiny level based on a second set of performance criteria after the period of heightened scrutiny. The first and second sets of performance criteria can be the same or different. As noted above, in a scenario where the first and second sets of performance criteria are the same, a frequency at which the driving performance level of the second vehicle driving control entity is evaluated at block 705 during the period of heightened scrutiny can be higher than after the period of heightened scrutiny is over at block 720. The process of FIG. 7 can be characterized as a form of "soft handoff" in the sense that the attempt to handoff control of the vehicle from one vehicle driving control entity to another is not truly complete until the target vehicle driving control entity is able to perform adequately during the period of heightened scrutiny.

Figure 8:
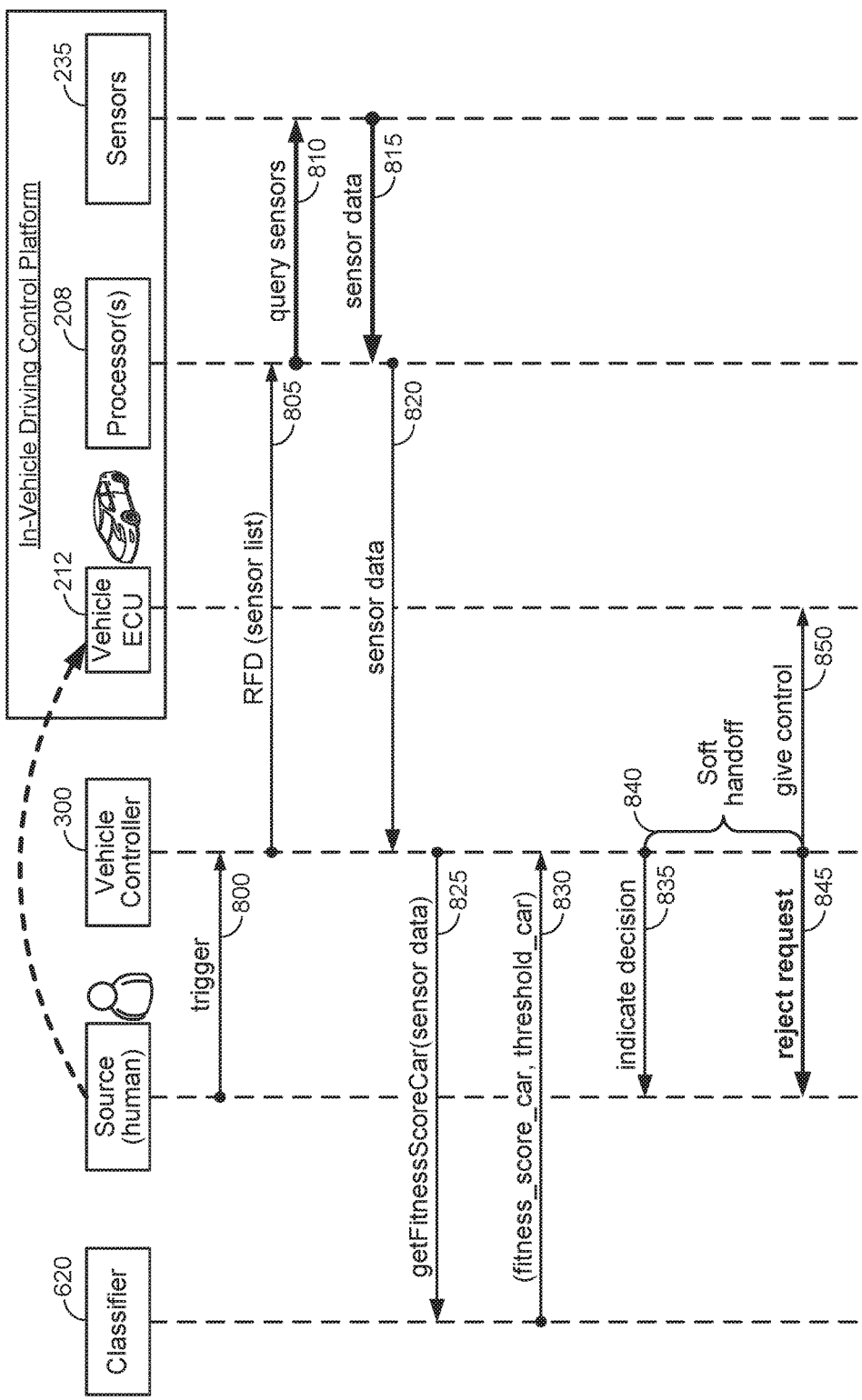
FIG. 8 illustrates an example implementation of the processes of FIGS. 5 and 7 in accordance with an embodiment of the disclosure.

FIG. 8 illustrates an example implementation of the processes of FIGS. 5 and 7 in accordance with an embodiment of the disclosure. In particular, the process of FIG. 8 depicts a scenario where the vehicle controller 300 of FIG. 3 attempts to transition driving control from the human driver to the vehicle ECU 212 of the vehicle 200.

Referring to FIG. 8, at 800, the human driver triggers the vehicle controller 300 to initiate an attempt to pass driving control from the human driver to the vehicle ECU. In an example, the trigger at 800 may correspond to voluntary user input that indicates a desire to transfer driving control to the vehicle ECU. In another example, the trigger at 800 may be involuntary from the perspective of the human driver (e.g., the human driver is driving poorly, the human driver is experiencing some sort of medical emergency such as cardiac events, etc.). At 805, the vehicle controller 300 sends a request for sensor data to the in-vehicle driving control platform 205. At 810, the processor(s) 208 query the sensors 235 for sensor data, which is returned at 815. While not shown in 815, the processor(s) 208 may also query (e.g., via a network connection) the optional remote sensors 245 for sensor data (e.g., to assess a fitness score of one or more remote vehicle driving control entities, such as a remote human driver or remote ECU). At 820, the processor(s) 208 send the sensor data to the vehicle controller 300. As noted above, in at least one embodiment, the vehicle controller 300 may be part of the in-vehicle driving control platform 205, in which the vehicle controller 300 may directly query the sensors 235 as part of its own execution via the processor(s) 208.

Referring to FIG. 8, at 825, the vehicle controller 300 sends the sensor data to the classifier 620 as part of a request for a fitness score (or a fit/unfit decision) for the vehicle ECU 212. At 830, the classifier 620 returns the fitness score for the vehicle ECU 212 and a dynamic threshold based on the sensor data. Alternatively, the classifier 620 can simply send the vehicle controller 300 a binary indication (yes/no) with respect to whether the vehicle ECU is fit to drive the vehicle 200. As noted above, the classifier 620 can be considered part of the vehicle controller 300 in at least one embodiment. At this point, the fitness score for the vehicle ECU 200 is a predicted driving performance level for the vehicle ECU 212, as in block 500 of FIG. 5.

Referring to FIG. 8, assume that the vehicle controller 300 compares the fitness score to the dynamic threshold from the classifier 620 and determines that the vehicle ECU 212 is fit to drive the vehicle 200. At 835, the human driver is notified that the driving control transfer is authorized (e.g., via an instrument control panel notification, an audio notification, etc.), and driving control is passed to the vehicle ECU 212 for a soft handoff period (or period of heightened scrutiny) at 840 (e.g., as in 505 of FIG. 5 or 700-705 of FIG. 7). Based on the actual driving performance level of the vehicle ECU 212 during the soft handoff period at 840 (e.g., which may be based on supplemental fitness scores being generated to assess the actual driving performance level via the classifier 620), the vehicle driving control entity transition from the human driver to the vehicle ECU 212 is either reversed or rejected at 845 (e.g., which transfers driving control back to the human driver, as in blocks 515-520 of FIG. 5 or 715, 725 of FIG. 7), or confirmed at 850 (e.g., with the soft handoff period or period of heightened scrutiny being discontinued, as at blocks 715-720 of FIG. 7).

Figure 9:
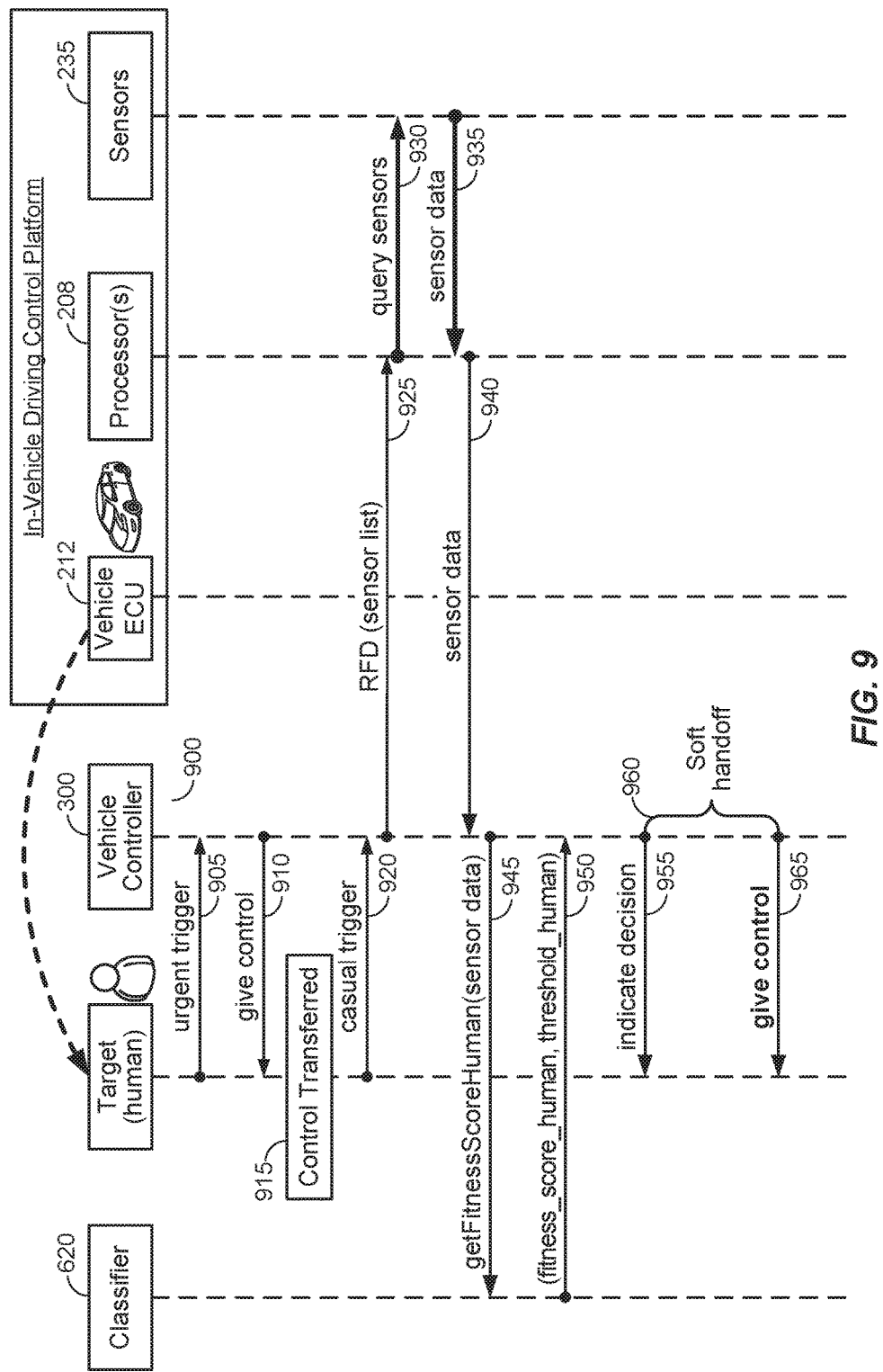
FIG. 9 illustrates an example implementation of the processes of FIGS. 5 and 7 in accordance with another embodiment of the disclosure.

FIG. 9 illustrates an example implementation of the processes of FIGS. 5 and 7 in accordance with another embodiment of the disclosure. In particular, the process of FIG. 9 depicts a scenario where the vehicle controller 300 of FIG. 3 attempts to transition driving control from the vehicle ECU 212 of the vehicle 200 to the human driver.

Referring to FIG. 9, at 905, the human driver triggers the vehicle controller 300 to initiate an attempt to pass driving control from the vehicle ECU to the human driver. In an example, assume that the trigger of 905 is an urgent trigger that overrides any critical analysis of the human driver's fitness to drive, and is used for emergencies where the human driver must take immediate control over the vehicle 200. Accordingly, the vehicle 300 transfers immediate driving control of the vehicle 200 to the human driver based on the urgent trigger at 905.

Referring to FIG. 9, at some point after 910, driving control is transferred (e.g., after the emergency has passed) from the human driver to some other vehicle driving control entity at 915 (e.g., the vehicle ECU 212, a remote ECU, a remote human driver, etc.). At 920, the human driver triggers the vehicle controller 300 to initiate an attempt to pass driving control back to the human driver. Unlike the urgent trigger of 905, assume that the trigger of 920 is a "casual" trigger, similar to the trigger at 800 of FIG. 8 as described above. In an example, the trigger at 920 may correspond to voluntary user input that indicates a desire to transfer driving control to the human driver. In another example, the trigger at 920 may be involuntary from the perspective of the human driver (e.g., the current vehicle driving control entity is the vehicle ECU 212 and one or more sensors critical to operation of the vehicle ECU 212 has failed or one or more sensors become impaired due to extreme ambient conditions such as strong sun glare, or the current vehicle driving control entity is a remote ECU or remote human driver and a network connection between the in-vehicle driving control platform 205 and the remote ECU or remote human driver has become disconnected, etc.). At 925, the vehicle controller 300 sends a request for sensor data to the in-vehicle driving control platform 205. At 930, the processor(s) 208 query the sensors 235 for sensor data, which is returned at 935. While not shown in 930, the processor(s) 208 may also query (e.g., via a network connection) the optional remote sensors 245 for sensor data (e.g., to assess a fitness score of one or more remote vehicle driving control entities, such as a remote human driver or remote ECU). At 940, the processor(s) 208 send the sensor data to the vehicle controller 300. As noted above, in at least one embodiment, the vehicle controller 300 may be part of the in-vehicle driving control platform 205, in which the vehicle controller 300 may directly query the sensors 235 as part of its own execution via the processor(s) 208.

Referring to FIG. 9, at 945, the vehicle controller 300 sends the sensor data to the classifier 620 as part of a request for a fitness score (or a fit/unfit decision) for the human driver. At 950, the classifier 620 returns the fitness score for the human driver and a dynamic threshold based on the sensor data. Alternatively, the classifier 620 can simply send the vehicle controller 300 a binary indication (yes/no) with respect to whether the human driver is fit to drive the vehicle 200. As noted above, the classifier 620 can be considered part of the vehicle controller 300 in at least one embodiment. At this point, the fitness score for the human driver is a predicted driving performance level for the human driver, as in block 500 of FIG. 5.

Referring to FIG. 9, assume that the vehicle controller 300 compares the fitness score to the dynamic threshold from the classifier 620 and determines that the human driver is fit to drive the vehicle 200 (e.g., the human driver is awake and alert, etc.). At 955, the human driver is notified that the driving control transfer is authorized (e.g., via an instrument control panel notification, an audio notification, etc.), and driving control is passed to the human driver for a soft handoff period (or period of heightened scrutiny) at 960 (e.g., as in 505 of FIG. 5 or 700-705 of FIG. 7). Based on the actual driving performance level of the human driver during the soft handoff period at 960 (e.g., which may be based on supplemental fitness scores being generated to assess the actual driving performance level via the classifier 620), assume that the vehicle driving control entity transition to the human driver is confirmed at 965 (e.g., with the soft handoff period or period of heightened scrutiny being discontinued, as at blocks 715-720 of FIG. 7).

Figure 10:
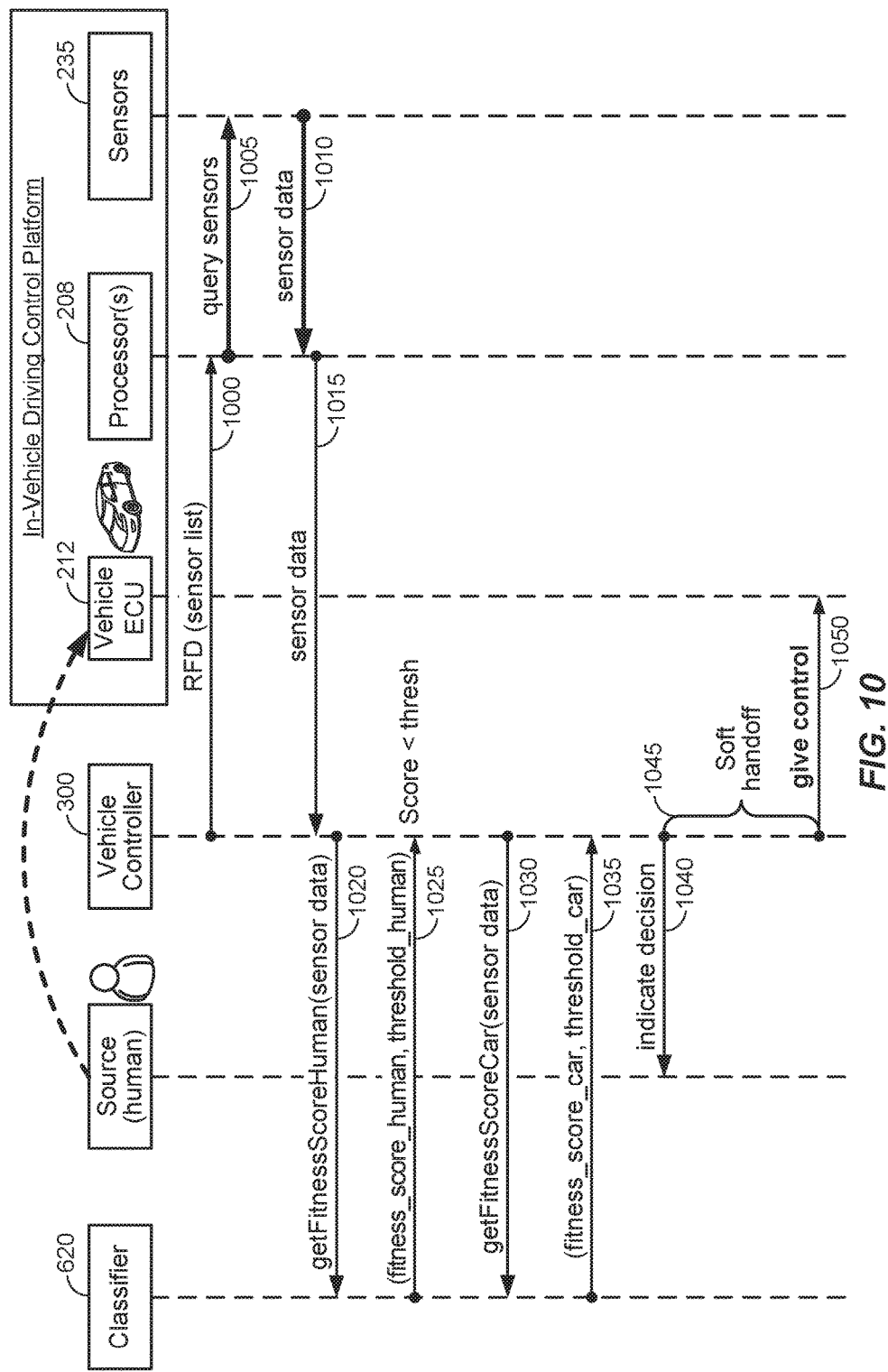
FIG. 10 illustrates an example implementation of the processes of FIGS. 5 and 7 in accordance with another embodiment of the disclosure.

FIG. 10 illustrates an example implementation of the processes of FIGS. 5 and 7 in accordance with another embodiment of the disclosure. In particular, the process of FIG. 10 depicts an alternative scenario where the vehicle controller 300 of FIG. 3 attempts to transition driving control from the human driver to the vehicle ECU 212 of the vehicle 200.

Referring to FIG. 10, assume that the human driver is in control of the vehicle 200. While the human driver is driving the vehicle 200, the vehicle controller 300 monitors the actual driving performance level of the human driver. Accordingly, at 1000, the vehicle controller 300 sends a request for sensor data to the in-vehicle driving control platform 205. At 1005, the processor(s) 208 query the sensors 235 for sensor data, which is returned at 1010. While not shown in 1005, the processor(s) 208 may also query (e.g., via a network connection) the optional remote sensors 245 for sensor data (e.g., to assess a fitness score of one or more remote vehicle driving control entities, such as a remote human driver or remote ECU). At 1015, the processor(s) 208 send the sensor data to the vehicle controller 300. As noted above, in at least one embodiment, the vehicle controller 300 may be part of the in-vehicle driving control platform 205, in which the vehicle controller 300 may directly query the sensors 235 as part of its own execution via the processor(s) 208.

Referring to FIG. 10, at 1020, the vehicle controller 300 sends the sensor data to the classifier 620 as part of a request for a fitness score (or a fit/unfit decision) for the human driver. At 1025, the classifier 620 returns the fitness score for the human driver and a dynamic threshold based on the sensor data. Alternatively, the classifier 620 can simply send the vehicle controller 300 a binary indication (yes/no) with respect to whether the human driver is fit to drive the vehicle 200. As noted above, the classifier 620 can be considered part of the vehicle controller 300 in at least one embodiment. At this point, the fitness score for the human driver is an actual driving performance level for the human driver, as in blocks 705 or 720 of FIG. 7.

Referring to FIG. 10, assume that the fitness score for the human driver returned by the classifier 620 at 1025 is lower than the dynamic threshold for the human driver, indicating that the human driver is unfit to drive. In this case, the detection of the human driver being unfit to drive triggers the vehicle controller 300 to begin a search to find a more suitable vehicle driving control entity. At 1030, the vehicle controller 300 sends the sensor data to the classifier 620 as part of a request for a fitness score (or a fit/unfit decision) for the vehicle ECU 212. While not shown in FIG. 10, the vehicle controller 300 may also request fitness scores for other vehicle driving control entities such as a remote ECU, a remote human driver and so on. At 1035, the classifier 620 returns the fitness score for the vehicle ECU 212 and a dynamic threshold for the vehicle ECU 212 based on the sensor data. The dynamic threshold for the vehicle ECU 212 returned at 1035 need not be the same as the dynamic threshold for the human driver returned at 1025 (e.g., the vehicle ECU 212 may operate better in a low-light environment relative to a human driver, which may lower the dynamic threshold for the vehicle ECU 212 if the sensor data indicates low ambient light levels, etc.). Alternatively, the classifier 620 can simply send the vehicle controller 300 a binary indication (yes/no) with respect to whether the vehicle ECU is fit to drive the vehicle 200. As noted above, the classifier 620 can be considered part of the vehicle controller 300 in at least one embodiment. At this point, the fitness score for the vehicle ECU 200 is a predicted driving performance level for the vehicle ECU 212, as in block 500 of FIG. 5.

In an alternative embodiment, instead of looking up fitness scores for other available vehicle driving control entities when a current vehicle driving control entity is deemed unfit to drive, the vehicle controller 300 may continuously track the various fitness scores for multiple vehicle driving control entities. In this case, 1030-1035 would not necessarily be triggered in response to the human driver being detected as unfit to drive at 1025, but rather based upon the ongoing or continuous fitness score tracking function of the vehicle controller 300.

Referring to FIG. 10, assume that the vehicle controller 300 compares the fitness score for the vehicle ECU 212 to the dynamic threshold for the vehicle ECU 212 from the classifier 620 and determines that the vehicle ECU 212 is fit to drive the vehicle 200. At 1040, the human driver is notified that driving control of the vehicle 200 is being transferred to the vehicle ECU 212 (e.g., via an instrument control panel notification, an audio notification, etc.), and driving control is passed to the vehicle ECU 212 for a soft handoff period (or period of heightened scrutiny) at 1045 (e.g., as in 505 of FIG. 5 or 700-705 of FIG. 7). Based on the actual driving performance level of the vehicle ECU 212 during the soft handoff period at 1045 (e.g., which may be based on supplemental fitness scores being generated to assess the actual driving performance level via the classifier 620), assume that the vehicle driving control entity transition from the human driver to the vehicle ECU 212 is confirmed at 1050 (e.g., with the soft handoff period or period of heightened scrutiny being discontinued, as at blocks 715-720 of FIG. 7). While not shown in FIG. 10, if the vehicle ECU 212 performs unacceptably during the soft handoff period of 1045, the vehicle controller 300 may attempt to transition driving control of the vehicle 200 to yet another vehicle driving control entity (if available) or may engage an emergency protocol to stop the vehicle 200 (e.g., pull the vehicle 200 over to side of ride, engage an emergency stop function, etc.) if there are no available fit vehicle driving control entities.

While FIGS. 8-10 depict examples related to transitions between a human driver and a vehicle ECU, it will be appreciated that other embodiments may be directed to transitions (or handoffs) between any type of vehicle driving control entity (e.g., a local or remote UE, a remote server, a remote human driver, etc.).

Table 1 (below) describes a number of example implementations of the process of FIG. 5 in accordance with embodiments of the disclosure. In Table 1, AFS denotes an actual fitness score (i.e., a fitness score based on actual driving performance of an in-control vehicle driving control entity), PFS denotes a predicted fitness score (i.e., a fitness score that is predicted for a vehicle driving control entity that is not in control of the vehicle), and VDCE denotes a vehicle driving control entity:

TABLE 1

| | Pre-Transition State | Predicted Driving Performance Level [500] | Actual Driving Performance Level [505-510] [Post-Transition] | Post-Transition Action [515/520] |
|---|---|---|---|---|
| 1 | VDCE in control: Human Driver [AFS: 85] Available VDCE(s): Vehicle ECU | Vehicle ECU: PFS = 95 | Transition to Vehicle ECU. AFS = 72. | Transition driving control back to human driver who had higher AFS |
| 2 | VDCE in control: Vehicle ECU [AFS: 85] Available VDCE(s): Human Driver; or Remote Human Driver | Human Driver [PFS = 80]; Remote Human Driver [PFS = 95] | Transition to Remote Human Driver. AFS = 95. | Maintain driving control with the Remote Human Driver |
| 3 | VDCE in control: Vehicle ECU [AFS: 85] Available VDCE(s): Human Driver; or Remote Human Driver | Human Driver [PFS = 80]; Remote Human Driver [PFS = 95] | Transition to Remote Human Driver. AFS = 60. | Transition driving control back to vehicle ECU who had higher AFS |

Referring to Table 1, in example #1, a human driver with AFS=85 is in control of a vehicle while a vehicle ECU is available, with vehicle ECU having PFS=95. The higher PFS for the vehicle ECU may be based on the sensors of the vehicle being verified as functioning normally, the location of the vehicle being in a region (e.g., a particular stretch of road or a particular type of road such as an interstate freeway, etc.) where vehicle ECUs have historically performed better than human drivers, and so on. However, after transitioning from the human driver to the vehicle ECU, the vehicle ECU is only able to achieve AFS=72. So, despite the prediction of PFS=95, the vehicle ECU does not actually perform the driving function very well, which prompts the vehicle controller to transition driving control back to the human driver.

Referring to Table 1, in example #2, a vehicle ECU with AFS=85 is in control of a vehicle while a human driver and a remote human driver are available, with the human driver having PFS=80 and the remote human driver having a higher PFS=95. The higher PFS for the remote human driver may occur because the remote human driver is a professional driver with a high reliability record, or because the human driver in the vehicle is asleep or tired, and so on. After transitioning from the vehicle ECU to the remote human driver, the remote human driver realizes the PFS by achieving AFS=95, so driving control remains with the remote human driver.

Referring to Table 1, in example #3, a vehicle ECU with AFS=85 is in control of a vehicle while a human driver and a remote human driver are available, with the human driver having PFS=80 and the remote human driver having a higher PFS=95. The higher PFS for the remote human driver may occur because the remote human driver is a professional driver with a high reliability record, or because the human driver in the vehicle is asleep or tired, and so on. After transitioning from the vehicle ECU to the remote human driver, the remote human driver realizes a lower AFS=60, so driving control is switched back to the vehicle ECU with the higher AFS. In an example, the remote human driver may perform with an unexpectedly low PFS in response to a degradation in a network connection that causes increased lag between the vehicle and the remote human driver, which would skew fitness scores in favor of a local vehicle driving control entity Table 2 (below) describes a number of example implementations of the process of FIG. 7 in accordance with embodiments of the disclosure. In Table 1, AFS denotes an actual fitness score (i.e., a fitness score based on actual driving performance of an in-control vehicle driving control entity), and VDCE denotes a vehicle driving control entity:

TABLE 2

| | VDCE Type After Driving Control Transition [700] | Period of Heightened Scrutiny [705] | Transition? [715] | Post-Transition Action [720/725] |
|---|---|---|---|---|
| 1 | Human Driver | Verify AFS > threshold #1 every 2 seconds | AFS remains above threshold #1 | After period of heightened scrutiny elapses, verify AFS > threshold #1 every 30 seconds |
| 2 | Vehicle ECU | Verify AFS > threshold #1 every 0.5 seconds | AFS drops below threshold #1 | Switch to a different VDCE with a higher PFS |
| 3 | Remote Server | Verify AFS > threshold #1 every 3 seconds, Also make sure that network connection > performance threshold | AFS remains above threshold #1, and network connection stays above performance threshold | After period of heightened scrutiny elapses, verify FAS > threshold #2 every 30 seconds |

Referring to Table 2, in example #1, driving control of a vehicle is transitioned to a human driver (e.g., as in block 700 of FIG. 7). During the period of heightened scrutiny (e.g., as in block 705 of FIG. 7), the vehicle controller verifies whether the AFS of the human driver remains above threshold #1 (e.g., a dynamic threshold, or a predetermined threshold used for the period of heightened scrutiny, etc.) at a 2 second interval. In this example, assume that the AFS of the human driver remains above threshold #1 during the period of heightened scrutiny (e.g., as in block 715 of FIG. 7). The vehicle controller thereby maintains driving control of the vehicle with the human driver after the period of heightened scrutiny, at which point the AFS of the human driver is only verified as being higher than threshold #1 every 30 seconds. In example #1, the same threshold #1 is used both during the period of heightened scrutiny and during default or normal operation, although other embodiments may use different thresholds (e.g., a higher threshold may be used during the period of heightened scrutiny).

Referring to Table 2, in example #2, driving control of a vehicle is transitioned to a vehicle ECU (e.g., as in block 700 of FIG. 7). During the period of heightened scrutiny (e.g., as in block 705 of FIG. 7), the vehicle controller verifies whether the AFS of the vehicle ECU remains above threshold #1 (e.g., a dynamic threshold, or a predetermined threshold used for the period of heightened scrutiny, etc.) at a 0.5 second interval. In this example, assume that the AFS of the vehicle ECU falls below threshold #1 during the period of heightened scrutiny (e.g., as in block 715 of FIG. 7). The vehicle controller thereby transitions driving control of the vehicle to a different vehicle driving control entity with a higher PFS.

Referring to Table 2, in example #3, driving control of a vehicle is transitioned to a remote server (e.g., as in block 700 of FIG. 7). During the period of heightened scrutiny (e.g., as in block 705 of FIG. 7), the vehicle controller verifies whether the AFS of the remote server remains above threshold #1 (e.g., a dynamic threshold, or a predetermined threshold used for the period of heightened scrutiny, etc.) at a 3 second interval. In this example, assume that the AFS of the remote server remains above threshold #1 during the period of heightened scrutiny (e.g., as in block 715 of FIG. 7). The vehicle controller thereby maintains driving control of the vehicle with the human driver after the period of heightened scrutiny, at which point the AFS of the human driver is verified as being higher than threshold #2 every 30 seconds. In contrast to example #1, a different threshold (e.g., higher than threshold #1) is used after the period of heightened scrutiny.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a DSP, an ASIC, a FPGA or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes CD, laser disc, optical disc, digital versatile disc (DVD), floppy disk and blu-ray disc where disks usually reproduce data magnetically, while discs reproduce data optically with lasers. Combinations of the above should also be included within the scope of computer-readable media.

While the foregoing disclosure shows illustrative embodiments of the disclosure, it should be noted that various changes and modifications could be made herein without departing from the scope of the disclosure as defined by the appended claims. The functions, steps and/or actions of the method claims in accordance with the embodiments of the disclosure described herein need not be performed in any particular order. Furthermore, although elements of the disclosure may be described or claimed in the singular, the plural is contemplated unless limitation to the singular is explicitly stated.

What is claimed is:

1. A method of operating a vehicle controller configured to selectively handoff control of a vehicle configured for autonomous operation between different vehicle driving control entities, comprising:
   determining a predicted driving performance level of a first vehicle driving control entity based on a first set of performance criteria while a vehicle is being controlled by a second vehicle driving control entity;
   transitioning driving control of the vehicle from the second vehicle driving control entity to the first vehicle driving control entity;
   determining an actual driving performance level of the first vehicle driving control entity based on a second set of performance criteria while the vehicle is being controlled by the first vehicle driving control entity; and
   determining whether to transition driving control of the vehicle from the first vehicle driving control entity to a vehicle driving control entity different than the first vehicle driving control entity based on the actual driving performance level of the first vehicle driving control entity,
   wherein the predicted driving performance level and/or the actual driving performance level are determined based at least in part upon sensor feedback from a first set of sensors in proximity to the vehicle and sensor feedback from a second set of sensors that is remote from the vehicle,
   wherein the second set of sensors is configured to monitor one or more remote vehicle driving control entities.

2. The method of claim 1, wherein the second set of performance criteria is used to evaluate the actual driving performance level of the first vehicle driving control entity at a higher frequency than the first set of performance criteria is used to evaluate the predicted driving performance level of the first vehicle driving control entity prior to the transitioning.

3. The method of claim 1, wherein the first and second sets of performance criteria are different.

4. The method of claim 1, wherein the determining whether to transition driving control includes:
   determining one or more predicted driving performance levels of one or more available vehicle driving control entities other than the first vehicle driving control entity.

5. The method of claim 4, wherein the determining whether to transition driving control further includes:
   determining that the actual driving performance level of the first vehicle driving control entity is below a performance threshold, and
   determining to transition driving control of the vehicle from the first vehicle driving control entity to a target vehicle driving control entity from the one or more available vehicle driving control entities with a predicted driving performance level that is higher than the performance threshold.

6. The method of claim 5, wherein the target vehicle driving control entity has the highest predicted driving performance level among the one or more available vehicle driving control entities.

7. The method of claim 1, wherein the first set of sensors includes a set of sensors physically integrated to or mounted upon the vehicle, a set of wearable sensors attached to a human driver in the vehicle, or a combination thereof.

8. A method of operating a vehicle controller configured to selectively handoff control of a vehicle configured for autonomous operation between different vehicle driving control entities, comprising:
  transitioning control of a vehicle from a first vehicle driving control entity to a second vehicle driving control entity, wherein the second vehicle driving control entity corresponds to an in-vehicle electronic control unit (ECU), a local user equipment (UE), or a remote vehicle driving control entity;
  initiating, in response to the transitioning, a temporary period of heightened scrutiny relative to a default scrutiny level during which an actual driving performance level of the second vehicle driving control entity is evaluated based on a first set of performance criteria; and
  determining whether to transition driving control of the vehicle from the second vehicle driving control entity to a vehicle driving control entity different than the second vehicle driving control entity based on the actual driving performance level of the second vehicle driving control entity.

9. The method of claim 8, wherein the determining determines to maintain driving control of the vehicle with the second vehicle driving control entity.

10. The method of claim 9, further comprising:
  after the temporary period of heightened scrutiny has elapsed, continuing to evaluate the actual driving performance level of the second vehicle driving control entity at the default scrutiny level based on a second set of performance criteria.

11. The method of claim 10, wherein the first set of performance criteria is used to evaluate the actual driving performance level of the second vehicle driving control entity at a higher frequency during the temporary period of heightened scrutiny than the second set of performance criteria is used to evaluate the actual driving performance level of the second vehicle driving control entity after the temporary period of heightened scrutiny has elapsed.

12. The method of claim 10, wherein the first and second sets of performance criteria are the same.

13. The method of claim 10, wherein the first and second sets of performance criteria are different.

14. The method of claim 8, wherein the determining whether to transition driving control includes:
  determining one or more predicted driving performance levels of one or more available vehicle driving control entities other than the second vehicle driving control entity.

15. The method of claim 14, wherein the determining whether to transition driving control further includes:
  determining that the actual driving performance level of the second vehicle driving control entity is below a performance threshold, and
  determining to transition driving control of the vehicle from the second vehicle driving control entity to a target vehicle driving control entity from the one or more available vehicle driving control entities with a predicted driving performance level that is higher than the performance threshold.

16. The method of claim 15, wherein the target vehicle driving control entity has the highest predicted driving performance level among the one or more available vehicle driving control entities.

17. The method of claim 8, wherein the actual driving performance level is determined based at least in part upon sensor feedback from a first set of sensors in proximity to the vehicle.

18. The method of claim 17, wherein the first set of sensors includes a set of sensors physically integrated to or mounted upon the vehicle, a set of wearable sensors attached to a human driver in the vehicle, or a combination thereof.

19. The method of claim 17, wherein the actual driving performance level is determined based at least in part upon sensor feedback from a second set of sensors that is remote from the vehicle.

20. The method of claim 19, wherein the second set of sensors is configured to monitor one or more remote vehicle driving control entities.

21. A vehicle controller configured to selectively handoff control of a vehicle configured for autonomous operation between different vehicle driving control entities, comprising:
  at least one processor coupled to a memory and configured to:
    determine a predicted driving performance level of a first vehicle driving control entity based on a first set of performance criteria while a vehicle is being controlled by a second vehicle driving control entity;
    transition driving control of the vehicle from the second vehicle driving control entity to the first vehicle driving control entity;
    determine an actual driving performance level of the first vehicle driving control entity based on a second set of performance criteria while the vehicle is being controlled by the first vehicle driving control entity; and
    determine whether to transition driving control of the vehicle from the first vehicle driving control entity to a vehicle driving control entity different than the first vehicle driving control entity based on the actual driving performance level of the first vehicle driving control entity,
  wherein the predicted driving performance level and/or the actual driving performance level are determined based at least in part upon sensor feedback from a first set of sensors in proximity to the vehicle and sensor feedback from a second set of sensors that is remote from the vehicle,
  wherein the second set of sensors is configured to monitor one or more remote vehicle driving control entities.

22. The vehicle controller of claim 21, wherein the at least one processor determines whether to transition driving control based on a determination of one or more predicted driving performance levels of one or more available vehicle driving control entities other than the first vehicle driving control entity.

23. The vehicle controller of claim 22, wherein the at least one processor determines whether to transition driving control by determining that the actual driving performance level of the first vehicle driving control entity is below a performance threshold, and determining to transition driving control of the vehicle from the first vehicle driving control entity to a target vehicle driving control entity from the one or more available vehicle driving control entities with a predicted driving performance level that is higher than the performance threshold.

24. A vehicle controller configured to selectively handoff control of a vehicle configured for autonomous operation between different vehicle driving control entities, comprising:
  at least one processor coupled to a memory and configured to:
    transition control of a vehicle from a first vehicle driving control entity to a second vehicle driving control entity, wherein the second vehicle driving control entity corresponds to an in-vehicle electronic control unit (ECU), a local user equipment (UE), or a remote vehicle driving control entity;
    initiate, in response to the transition, a temporary period of heightened scrutiny relative to a default scrutiny level during which an actual driving performance level of the second vehicle driving control entity is evaluated based on a first set of performance criteria; and
    determine whether to transition driving control of the vehicle from the second vehicle driving control entity to a vehicle driving control entity different than the second vehicle driving control entity based on the actual driving performance level of the second vehicle driving control entity.

25. The vehicle controller of claim 24, wherein the at least one processor determines whether to transition driving control based on a determination of one or more predicted driving performance levels of one or more available vehicle driving control entities other than the second vehicle driving control entity.

* * * * *